United States Patent
Sawai

(10) Patent No.: US 11,064,092 B2
(45) Date of Patent: Jul. 13, 2021

(54) IMAGE PROCESSING APPARATUS AND IMAGE PROCESSING METHOD FOR DETECTING A PREDETERMINED OBJECT IN A CAPTURED IMAGE

(71) Applicant: CANON KABUSHIKI KAISHA, Tokyo (JP)

(72) Inventor: Yosuke Sawai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

(21) Appl. No.: 16/247,413

(22) Filed: Jan. 14, 2019

(65) Prior Publication Data

US 2019/0222718 A1    Jul. 18, 2019

(30) Foreign Application Priority Data

Jan. 16, 2018   (JP) .............................. JP2018-005146

(51) Int. Cl.
| | | |
|---|---|---|
| *G06K 9/00* | (2006.01) | |
| *H04N 1/44* | (2006.01) | |
| *G06T 11/60* | (2006.01) | |

(52) U.S. Cl.
CPC ........... *H04N 1/4493* (2013.01); *G06T 11/60* (2013.01); *H04N 2201/0084* (2013.01)

(58) Field of Classification Search
CPC ...................... G06T 7/194; G06T 7/254; G06T 2207/30196; G06T 2207/30232;

(Continued)

(56) References Cited

U.S. PATENT DOCUMENTS

| 9,646,222 B1 * | 5/2017 | Conway .................... G06T 7/11 |
| 9,648,285 B2 * | 5/2017 | Traff ........................ H04N 5/33 |

(Continued)

FOREIGN PATENT DOCUMENTS

| CN | 1472691 A | 2/2004 |
| CN | 1954592 A | 4/2007 |

(Continued)

OTHER PUBLICATIONS

Zhang, Wei, Sen-ching S. Cheung, and Minghua Chen. "Hiding privacy information in video surveillance system." IEEE International Conference on Image Processing 2005. vol. 3. IEEE, 2005. (Year: 2005).*

(Continued)

*Primary Examiner* — Li Liu
(74) *Attorney, Agent, or Firm* — Canon U.S.A., Inc. IP Division

(57) ABSTRACT

An image processing apparatus includes a detection unit configured to detect a predetermined object in a captured image captured by an imaging unit, a first acquisition unit configured to acquire, as a first image, a captured image captured during a time period in which the object is not detected, based on detection of the predetermined object by the detection unit, a second acquisition unit configured to acquire, as a second image, a captured image in which the predetermined object is detected by the detection unit, a generation unit configured to generate a mask image of the predetermined object based on the first and the second images, and a combination unit configured to combine the mask image with the first image or the second image.

15 Claims, 6 Drawing Sheets

(58) Field of Classification Search
CPC .............. G06T 7/215; G08B 13/19686; G08B 13/19602; G08B 13/19604; G06K 2209/21; G06K 9/00362
See application file for complete search history.

(56) References Cited

U.S. PATENT DOCUMENTS

| | | | |
|---|---|---|---|
| 10,367,986 B1* | 7/2019 | Berenberg | G06K 9/00771 |
| 10,595,060 B2* | 3/2020 | Oya | H04N 21/2347 |
| 2002/0006163 A1* | 1/2002 | Hibi | G08B 13/19602 |
| | | | 375/240.16 |
| 2009/0207269 A1 | 8/2009 | Yoda | |
| 2014/0023248 A1 | 1/2014 | Yoo et al. | |
| 2014/0029804 A1* | 1/2014 | Kawaguchi | G06T 11/60 |
| | | | 382/105 |
| 2016/0026875 A1* | 1/2016 | Matsumoto | G06K 9/00771 |
| | | | 348/143 |
| 2018/0122117 A1* | 5/2018 | Kawano | G06T 1/0007 |
| 2018/0270454 A1* | 9/2018 | Deng | G08B 13/19608 |
| 2018/0308242 A1* | 10/2018 | Honjo | G06T 7/254 |
| 2019/0012793 A1* | 1/2019 | Ito | G06T 7/11 |

FOREIGN PATENT DOCUMENTS

| | | |
|---|---|---|
| CN | 101998113 A | 3/2011 |
| CN | 102404496 A | 4/2012 |
| CN | 104246688 A | 12/2014 |
| CN | 104982029 A | 10/2015 |
| CN | 105306884 A | 2/2016 |
| CN | 105323473 A | 2/2016 |
| CN | 105469379 A | 4/2016 |
| CN | 105827947 A | 8/2016 |
| CN | 107038362 A | 8/2017 |
| CN | 107294915 A | 10/2017 |
| CN | 107409166 A | 11/2017 |
| JP | 2008191884 A | 8/2008 |
| JP | 4578044 B2 | 11/2010 |
| JP | 4672680 B2 | 4/2011 |
| JP | 5834193 B2 | 12/2015 |
| JP | 2017098879 A | 6/2017 |

OTHER PUBLICATIONS

Chen, Datong, et al. "Tools for protecting the privacy of specific individuals in video." EURASIP Journal on Advances in Signal Processing 2007 (2007): 1-9. (Year: 2007).*

Thomas Winkler et al; Security and Privacy Protection in Visual Sensor Networks: A Survey; ACM Computing Surveys, vol. 47, No. 1, Article 2, Apr. 2014 pp. 1-42.

Tong Ling-Ling, et al., Review on Video Privacy Protection, Journal on Communications, Aug. 2013, pp. 154-160, vol. 34, No. 8, China Academic Journal Electronic Publishing House.

* cited by examiner

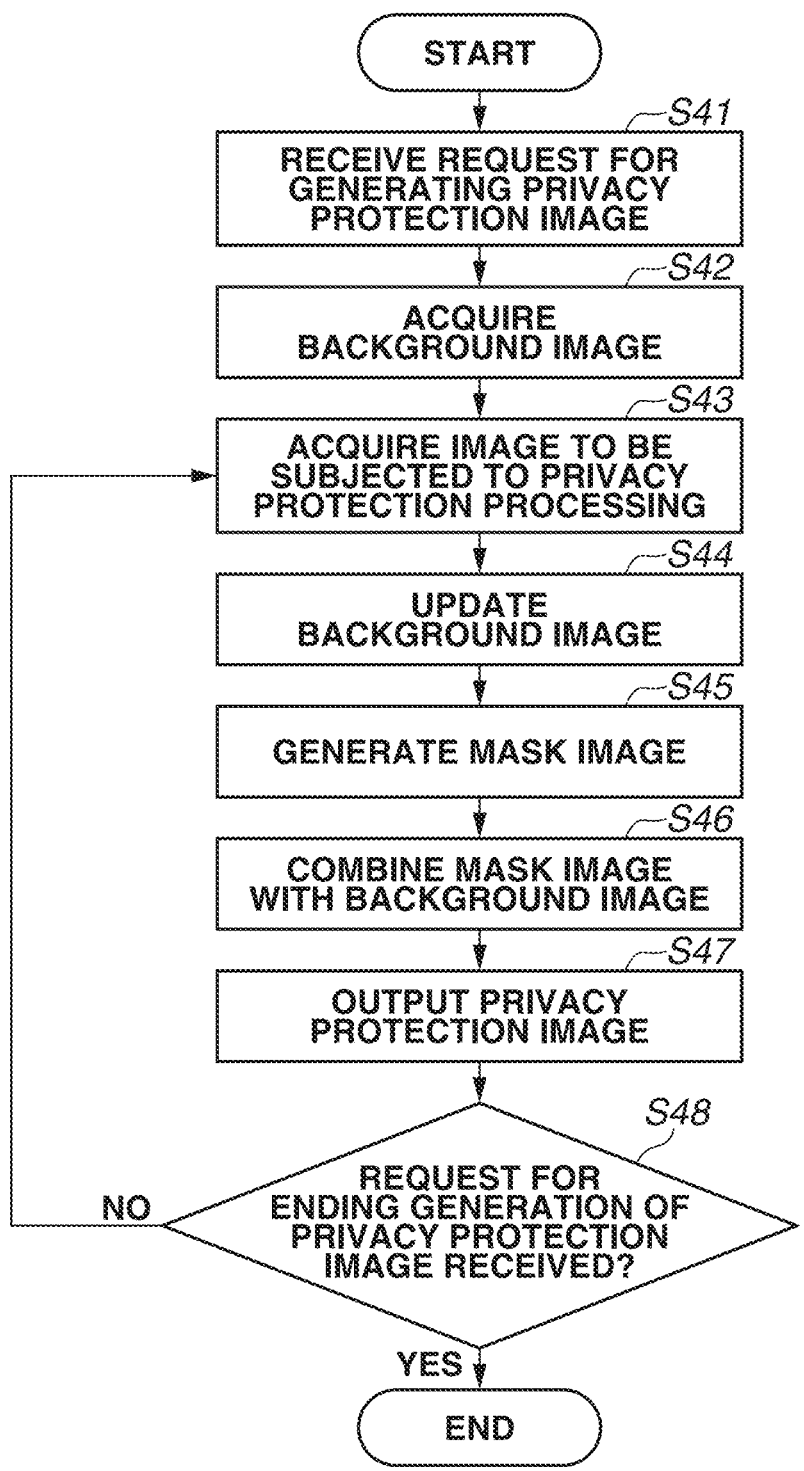

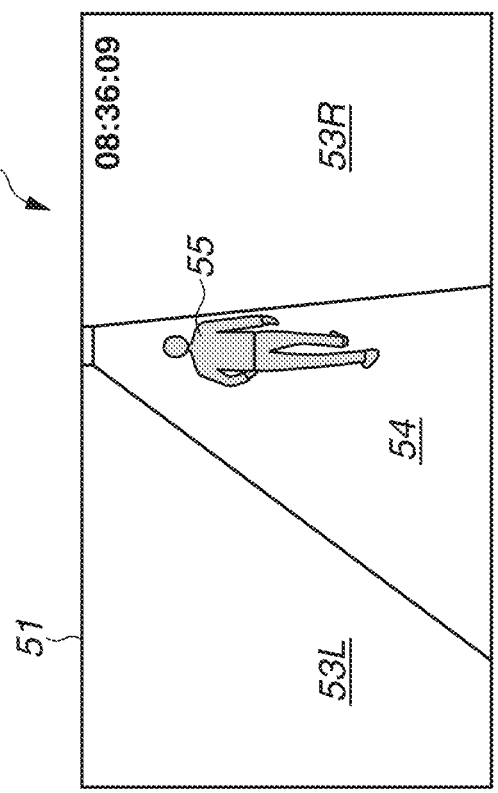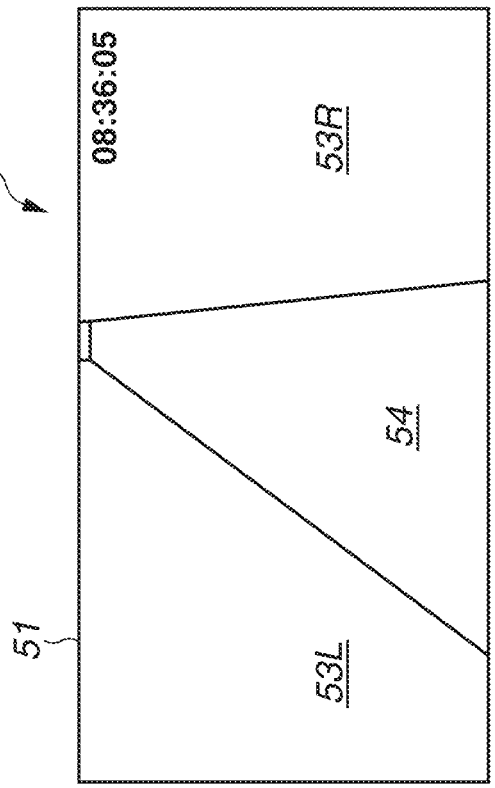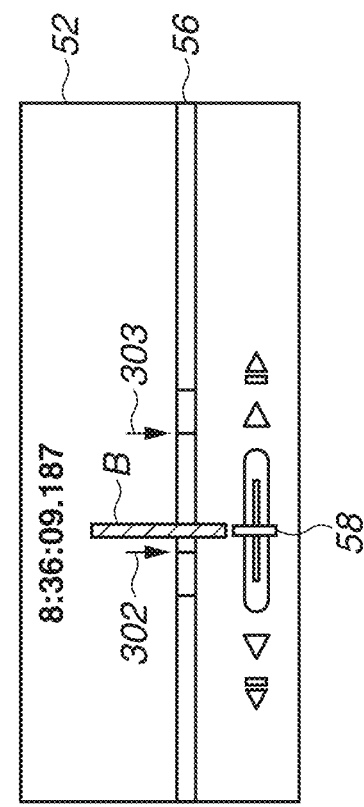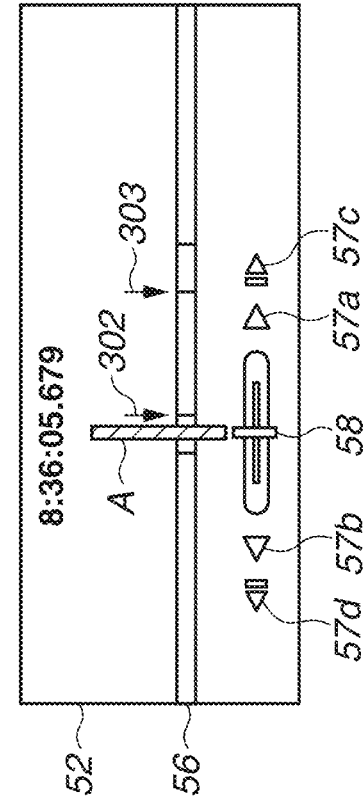
FIG.5A  FIG.5B

IMAGE PROCESSING APPARATUS AND IMAGE PROCESSING METHOD FOR DETECTING A PREDETERMINED OBJECT IN A CAPTURED IMAGE

BACKGROUND OF THE INVENTION

Field of the Invention

The present invention relates to an image processing apparatus and an image processing method.

Description of the Related Art

In recent years, monitoring cameras and Video Management Software (VMS) systems for storing images of monitoring cameras have been widely installed. In addition, the importance of the privacy protection of individuals in images captured by monitoring cameras is increasing. Japanese Patent No. 5834193 discusses a technique (monitoring apparatus) for generating an image in which a human body area is masked based on a human body detection result. Japanese Patent No. 4578044 discusses a technique for sending contour information about a difference area between an image extracted by a monitoring module and a reference image to a reception unit, and combining the contour information with a background image and displaying the combined image by the reception unit.

Using a plurality of images, the monitoring apparatus discussed in Japanese Patent No. 5834193 generates a background image from which a person has been removed. On the generated background image, a mask image is superimposed to generate a privacy protection image. Because of such a configuration, the monitoring apparatus discussed in Japanese Patent No. 5834193 executes processing for generating a background image from which a person has been removed and takes time for the processing. If an image in which a person is present is used as a background image, a generated image is no longer called as a privacy protection image.

A technique discussed in Japanese Patent No. 4578044 combines a fixed background image with contour information. Because of such a configuration, the technique discussed in Japanese Patent No. 4578044 cannot reflect changes in the real world captured by a camera on the background, making it impossible to provide a surveillant with sufficient information about environmental changes.

SUMMARY OF THE INVENTION

According to an aspect of the present invention, an image processing apparatus includes a detection unit configured to detect a predetermined object in a captured image captured by an imaging unit, a first acquisition unit configured to acquire, as a first image, a captured image captured during a time period in which the object is not detected, based on detection of the predetermined object by the detection unit, a second acquisition unit configured to acquire, as a second image, a captured image in which the predetermined object is detected by the detection unit, a generation unit configured to generate a mask image of the predetermined object based on the first and the second images, and a combination unit configured to combine the mask image with the first image or the second image.

Further features of the present invention will become apparent from the following description of exemplary embodiments with reference to the attached drawings.

BRIEF DESCRIPTION OF THE DRAWINGS

FIG. 4 is a flowchart illustrating generation of a privacy protection image according to the first exemplary embodiment.

FIGS. 5A and 5B illustrate a display unit connected to the image processing apparatus according to the first exemplary embodiment.

DESCRIPTION OF THE EMBODIMENTS

Exemplary embodiments of the present invention will be described in detail below with reference to the accompanying drawings. It is to be noted that the following exemplary embodiments are merely examples for implementing the present invention and can be appropriately modified or changed depending on individual constructions and various conditions of apparatuses to which the present invention is applied. Thus, the present invention is in no way limited to the following exemplary embodiments.

(Hardware Configuration of Image Processing Apparatus)

Figure 1:
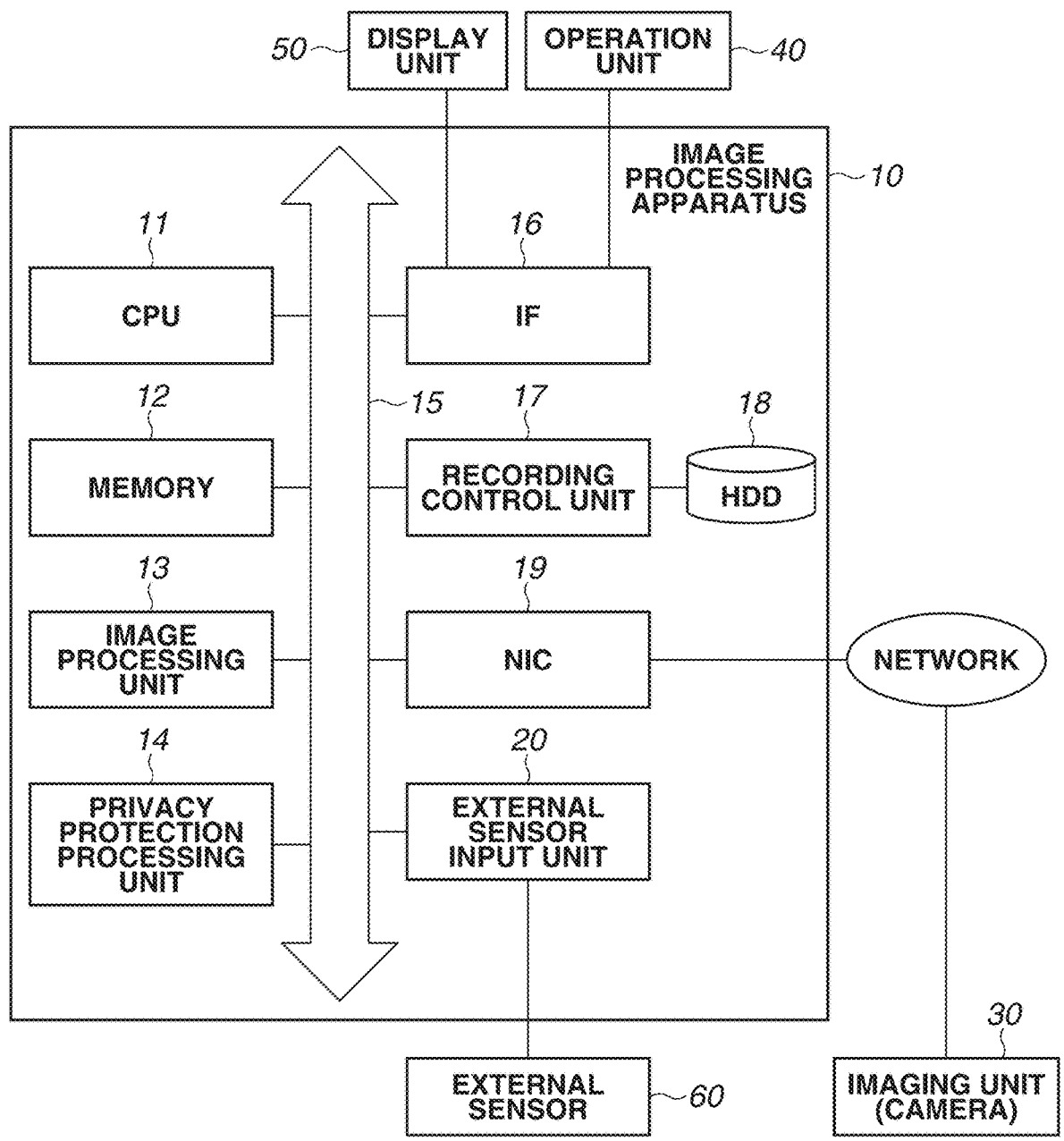
FIG. 1 illustrates an example of a hardware configuration of an image processing apparatus according to a first exemplary embodiment.

FIG. 1 is a conceptual view illustrating a hardware configuration of an image processing apparatus 10 according to the present exemplary embodiment.

The image processing apparatus 10 includes a central processing unit (CPU) 11, a memory 12, an image processing unit 13, a privacy protection processing unit 14, a system bus 15, an interface (IF) 16, a recording control unit 17, a hard disk drive (HDD) 18, a network interface card (NIC) 19, and an external sensor input unit 20. The image processing apparatus 10 silhouettes (masks), for example, a human body area detected in an image (image group) captured by an imaging unit 30 installed in a monitoring area and outputs the human body area as a privacy protection image. The imaging unit 30 includes a camera having lenses and sensors. According to the present exemplary embodiment, the imaging unit 30 includes one camera, for example, a network camera.

The CPU 11 controls units 12 to 14 and 16 to 20 connected to the system bus 15.

The memory 12 stores a Basic Input Output System (BIOS) program and a boot program. The memory 12 is used as the main memory unit of the CPU 11. The memory 12 includes, for example, a storage medium, such as a read only memory (ROM), random access memory (RAM), flash memory, and detachably attached secure digital (SD) card.

The image processing unit 13 serves as a function block having image processing functions including moving object detection, human body detection, and face detection. Detection targets, such as a moving object, human body, and face, are collectively referred to as objects. The image processing functions of the image processing unit 13 are controlled according to instructions from the CPU 11. The image processing unit 13 transmits and receives data to/from the units 11, 12, 14, and 16 to 20 via the system bus 15. The image processing unit 13 detects a predetermined object in a captured image.

The privacy protection processing unit 14 serves as a function block for performing privacy protection processing on an image. The privacy protection processing function of the privacy protection processing unit 14 is controlled according to instructions from the CPU 11. The privacy protection processing unit 14 transmits and receives data to/from the units 11 to 13 and 16 to 20 via the system bus 15.

The operation unit 40, such as a keyboard and mouse and the display unit 50, are connected to the interface 16. The display unit 50 is provided with a graphical user interface (GUI) (described below with reference to FIGS. 5A and 5B). The display unit 50 receives instructions from the CPU 11 via the interface 16 and, for example, displays an image. The operation unit 40 and the display unit (GUI) 50 are used by the user of the image processing apparatus 10 to input data, information, and an instruction. The display unit 50 may include a sound output unit.

The recording control unit 17 writes and reads data (image) to/from the HDD 18 according to instructions and requests from the CPU 11 and other function blocks (the image processing unit 13 and the privacy protection processing unit 14).

The HDD 18 serves as an image storage unit having two areas. One area among the two areas of the HDD 18 is for continuously storing and recording images captured by the imaging unit 30. Images input from the imaging unit 30 are sequentially stored and recorded in this area. The recording time period capacity is determined by the storage capacity of the HDD 18. An image which has been stored for a predetermined time period is overwritten. Unless an overwritten image is moved to or stored in other memory areas, the overwritten image is erased. The other area among the two areas of the HDD 18 is for storing and recording images during a detection time period when an object (for example, a human body) is detected. An image during the detection time period is an image subjected to the privacy protection processing according to the present exemplary embodiment. Images in this area are not overwritten at least until the privacy protection processing is completed.

The NIC 19 is connected with a network using a wired or wireless connection to perform information and image communication via the network. According to the first exemplary embodiment, the imaging unit 30 is connected with the NIC 19 via a network. The imaging unit 30 and the image processing apparatus 10 may be connected via a medium other than a network to communicate with each other.

The external sensor input unit 20 is connected with an external sensor (illumination sensor, infrared sensor, sound sensor, automatic door sensor, distance sensor, temperature sensor, etc.) 60 using a wired or wireless connection. The external sensor input unit 20 receives information from the external sensor 60. An infrared sensor and distance sensor can be used, for example, as a human sensor.

(Software Configuration of Image Processing Apparatus)

Figure 2:
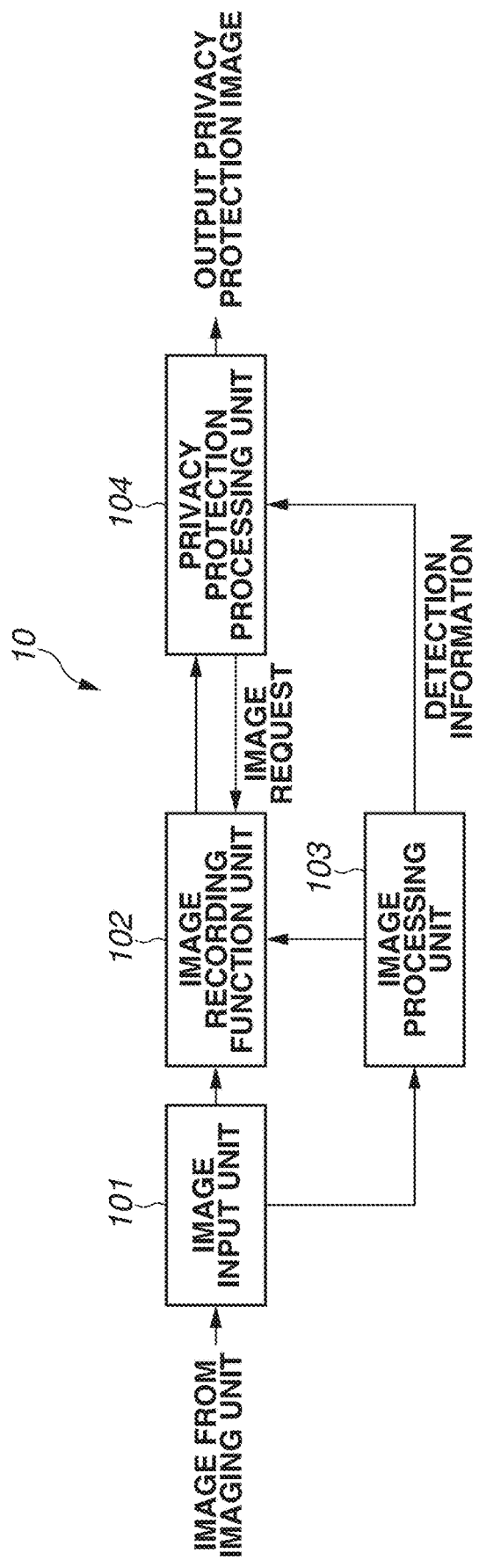
FIG. 2 illustrates an example of a software configuration of the image processing apparatus according to the first exemplary embodiment.

FIG. 2 illustrates software function blocks of the image processing apparatus 10. The image processing apparatus 10 includes an image input unit 101, an image recording function unit 102, an image processing unit 103, and a privacy protection processing unit 104.

The image input unit 101 sequentially acquires images from the imaging unit 30 at predetermined intervals and provides the image recording function unit 102 and the image processing unit 103 with these images. An image input to the image input unit 101 may be displayed on the display unit 50.

The image recording function unit 102 stores an image (input image) input from the imaging unit 30 in the HDD 18 (illustrated in FIG. 1). This storage operation is performed for continuous recording. According to a setting of the image processing apparatus 10, all of input images are stored or images in predetermined time periods are thinned out when storing images. The image recording function unit 102 performs continuous recording and has a function of storing, in the HDD 18, an image having been continuously recorded since the time slightly before receiving detection information (detection event information) about human body detection from the image processing unit 103. The image recording function unit 102 also has a function of storing in the HDD 18 an image in a predetermined time period after the end of a detection event.

In addition, the image recording function unit 102 can start and end recording (recording for the privacy protection processing) based on the detection information from the image processing unit 103. More specifically, the image recording function unit 102 also has a function of storing and recording, in the HDD 18, images (images during the detection time period) since a detection event occurs till it ends.

The image processing unit 103 performs image processing such as moving object detection processing, human body detection processing, and face detection processing. When a detection event occurs, for example, when a human body is detected in an image input from the image input unit 101, the image processing unit 103 transmits the detection information (such as detection event information and generation time) to the privacy protection processing unit 104 based on a setting of the image processing apparatus 10. According to the present exemplary embodiment, the image processing unit 103 detects a human body. When a human body is no longer detected, the image processing unit 103 transmits the detection information (information notifying that a human body is no longer detected) to the privacy protection processing unit 104. When a human body is no longer detected, the image processing unit 103 may transmit a request for ending generation of a privacy protection image to the privacy protection processing unit 104. The image processing unit 103 illustrated in FIG. 2 is equivalent to the image processing unit 13 illustrated in FIG. 1.

The privacy protection processing unit 104 generates a privacy protection image in which the portion of a human body subjected to privacy protection is masked by a mask image. When generating a privacy protection image, the privacy protection processing unit 104 acquires image data of the background where no human body is present (hereinafter referred to as a "background image"). Then, to extract areas to be masked, the privacy protection processing unit 104 calculates the difference between the background image and the input image and generates a foreground image. The foreground image is an image having the shape of a human body which is not present in the background image. According to the present exemplary embodiment, the entire foreground image is a gray silhouette image which is to be used as a mask image. By combining the mask image with the background image, the privacy protection processing unit 104 generates a privacy protection image in which the human body area is masked. The privacy protection processing unit 104 illustrated in FIG. 2 is equivalent to the privacy protection processing unit 14 illustrated in FIG. 1.

The generated privacy protection image may be constantly output from the image processing apparatus 10, or may be stored in the HDD 18 in the image processing apparatus 10 and output in response to a request from outside. The privacy protection image is output, for example, to the display unit 50. The privacy protection image may be output to an external apparatus via a network.

Figure 3:
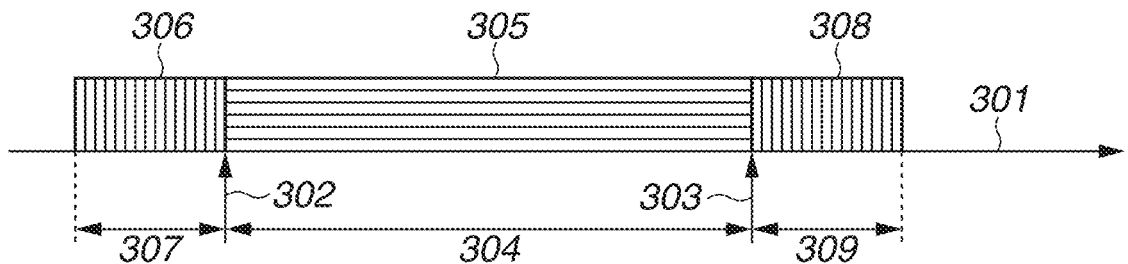
FIG. 3 illustrates a timing of detecting a human body subjected to privacy protection and recording time periods according to the first exemplary embodiment.

The privacy protection processing unit 104 may start the privacy protection processing is, for example, when an image is input from the image recording function unit 102 to the privacy protection processing unit 104 or when the image recording function unit 102 records an image (a timing 302 illustrated in FIG. 3). Alternatively, the privacy protection processing unit 104 may start the privacy protection processing when the detection information (detection event information) from the image processing unit 103 is input to the privacy protection processing unit 104.

When the user wants the privacy protection processing to be performed on an image recorded in the HDD 18, for example, the user issues an instruction to perform the privacy protection processing using the operation unit 40 of the image processing apparatus 10. In response to the instruction, the privacy protection processing unit 104 starts the privacy protection processing.

FIG. 3 illustrates a relation between the recording time period when a detection event occurs and a recording start (privacy protection processing start) trigger according to the present exemplary embodiment.

A horizontal axis 301 illustrated in FIG. 3 indicates a lapse of time. The horizontal axis 301 includes a detection event occurrence timing 302 serving as a recording start (privacy protection processing start) trigger and a detection end timing 303. A time period between the timings 302 and 303 is a detection time period 304. The detection event occurrence timing 302 indicates the starting point of the detection time period 304, and the detection end timing 303 indicates the ending point of the detection time period 304. The image recording function unit 102 records an image group (hereinafter referred to as an "image") 305 captured during the detection time period 304 and at the same time stores an image 306 having been continuously recorded before the detection event occurrence timing (detection start timing) 302 during a predetermined time. In FIG. 3, a predetermined time period 307 is the time period during which continuous recording is performed before the detection start timing 302. The image recording function unit 102 also stores an image 308 captured after the detection end timing 303 during a predetermined time. In FIG. 3, a predetermined time period 309 is the time period after the detection end timing 303. The predetermined time periods 307 and 309 may be determined based on a setting of the image processing apparatus 10 (the image recording function unit 102). The image 306 is captured at a timing that is outside the detection time period 304 and close to (immediately before) the starting point of the detection time period 304. The image 308 is captured at a timing that is outside the detection time period 304 and at a timing close to (immediately after) the ending point of the detection time period 304. The timing outside the detection time period 304 refers to a time period during which the predetermined object is not detected.

(Operation Procedure for Generating Privacy Protection Image)

An operation procedure for generating a privacy protection image will be described below with reference to the flowchart illustrated in FIG. 4. The operation procedure in the flowchart illustrated in FIG. 4 is performed in such a manner that the CPU 11 of the image processing apparatus 10 executes a program stored in the memory 12. According to the present exemplary embodiment, the image 306 as a background image and a privacy protection target image 305 have already been stored in the HDD 18 before the flowchart illustrated in FIG. 4 is started.

In step S41, the privacy protection processing unit 104 receives a request for generating a privacy protection image. Generation of a privacy protection image is requested in such a manner that the image processing unit 103 notifies the privacy protection processing unit 104 of human body detection (detection event) as the detection information. This is efficient in a case where the user wants to acquire an image on which the privacy protection processing has been performed if a human body has been detected and wants the privacy protection processing to be not performed if no human body is present in the monitoring area.

Upon receipt of a request for generation of a privacy protection image, then in step S42, the privacy protection processing unit 104 acquires a background image. It is desirable that an image including a background and including no subject is used as a background image. According to the present exemplary embodiment, the privacy protection processing unit 104 uses the image 306 captured before the detection start timing 302 illustrated in FIG. 3 (more precisely, an image in an image group captured during the predetermined time period 307) as a background image. This is because images captured before the detection start timing 302 can be considered as images including no human body. The image 306 is an image captured at a timing immediately before (close to) the detection start timing 302. The privacy protection processing unit 104 acquires the image 306 from the image recording function unit 102 (the HDD 18) and sets the image 306 as a background image.

When the privacy protection processing unit 104 acquires an image from the image recording function unit 102 (HDD 18), the privacy protection processing unit 104 transmits the "image request" illustrated in FIG. 2 to the image recording function unit 102.

In step S43, the privacy protection processing unit 104 acquires the image 305 to be subjected to the privacy protection processing from the image recording function unit 102 (HDD 18).

In step S44, the privacy protection processing unit 104 updates the background image acquired in step S42 based on the image 305 acquired in step S43 to the latest state (latest background image).

In step S45, the privacy protection processing unit 104 generates a mask image. More specifically, the privacy protection processing unit 104 calculates the difference between the image 305 for the privacy protection processing and the background image 306 and generates a mask image using the difference.

In step S46, the privacy protection processing unit 104 combines the mask image generated in step S45 with the background image to generates a privacy protection image.

In step S47, the privacy protection processing unit 104 outputs the privacy protection image generated in step S46.

In step S48, the privacy protection processing unit 104 determines whether a request for ending generation of a privacy protection image is received from the image processing unit 103. Upon completion of the detection time period 304 of the image processing unit 103, the image processing unit 103 transmits a request for ending generation of a privacy protection image to the privacy protection processing unit 104. More specifically, when a human body is no longer detected, the image processing unit 103 transmits a request for ending generation of a privacy protection image to the privacy protection processing unit 104. When the privacy protection processing unit 104 receives a request for ending generation of a privacy protection image (YES in step S48), the processing ends the flowchart illustrated in FIG. 4.

When the privacy protection processing unit 104 does not receive a request for ending generation of a privacy protection image (NO in step S48), the processing returns to step S43. Then, the privacy protection processing unit 104 performs steps S43 to S47. In other words, the privacy protection processing unit 104 continues to generate and output a privacy protection image.

To provide a time limit for the execution time of the privacy protection processing, the privacy protection processing unit 104 may be provided with a timer for counting (measuring) the time starting from when the privacy protection processing is started. In this case, in step S48, the privacy protection processing unit 104 ends generation of a privacy protection image when the measurement time measured by the timer exceeds a set time.

(Monitor and GUI of Display Unit)

FIGS. 5A and 5B illustrate the monitor 51 and the GUI 52 in the display unit 50. According to the present exemplary embodiment, the imaging unit 30 is installed on the ceiling of a corridor to capture an image of a person walking along the corridor.

An image displayed on the monitor 51 illustrated in FIG. 5A is an image captured when there is no person in the corridor and is an image transmitted from the imaging unit 30 to the display unit 50 via the image processing apparatus 10. The image illustrated in FIG. 5A includes a right wall 53R, a left wall 53L, and a floor 54 of the corridor. The image capturing time is 8:36:05 am.

A GUI 52 is provided at the bottom of the monitor 51. The GUI 52 includes the time line 56. Timings 302 and 303 indicated by the arrows illustrated on the time line 56 are the same as the timings 302 and 303 indicated by the arrows illustrated in FIG. 3.

The image displayed on the monitor 51 illustrated in FIG. 5B is an image captured when the person 55 is walking along the corridor. The image illustrated in FIG. 5B is a privacy protection image, and the detected human body is a gray silhouette image. The image capturing time is 8:36:09 am.

The image capturing time of the image illustrated in FIG. 5A is 8:36:05 am, and the image capturing time of the image illustrated in FIG. 5B is 8:36:09 am. The human body is therefore detected within 4 seconds after the image illustrated in FIG. 5A is captured. The image illustrated in FIG. 5A is thus an image captured immediately before the human body detection and is equivalent to the image 306 illustrated in FIG. 3. The time line 56 of the GUI 52 displays the time periods 304, 307, and 309, illustrated in FIG. 3, in a band shape. The rectangle (band) to the left of the detection start timing 302 is the predetermined time period 307, the rectangle between the timings 302 and 303 is the detection time period 304, and the rectangle to the right of the detection end timing 303 is the predetermined time period 309. For example, the detection time period 304 is displayed in red, and the predetermined time periods 307 and 309 are displayed in pink. The time line 56 also displays a thick line A (hatched box) indicating the acquisition timing of a background image. This enables the user to recognize that an image acquired at the time indicated by the thick line A in the predetermined time period 307 is used as the background image in step S42. In the vicinity of the thick line A, "8:36:05.679" is displayed to indicate a more exact image capturing time.

By operating a playback button 57a, a rewind button 57b, a fast forward button 57c, a fast rewind button 57d, and a knob (slider) 58, the user of the image processing apparatus 10 can instruct the image processing apparatus 10 to display the image captured at 8:36:05 am on the display unit 50. More specifically, the user can give an instruction for using the image captured at 8:36:05 am as the background image in step S42 to the privacy protection processing unit 104. After confirming that no person is included in the image illustrated in FIG. 5A, the user can issue an instruction for using the image illustrated in FIG. 5A as a background image. For example, when a part of a person appears in the image illustrated in FIG. 5A, the user searches for an image including no person by slightly moving the knob 58 to the left and then determines that the thus searched image is to be used as a background image.

The thick line B (hatched box) illustrated in FIG. 5B indicates the image capturing time illustrated in FIG. 5B.

(Modifications)

In the above-described exemplary embodiment, the background image to be used for the privacy protection processing is acquired during the predetermined time period 307 before the detection start timing 302. The present invention is however not limited to the present exemplary embodiment. The image 308 captured in the predetermined time period 309 after the detection end timing 303 may be used as a background image. For example, in a case where an automatic lighting is installed in the monitoring area, the lighting is turned ON when a human body is detected. In such a case, since the image 306 captured during the predetermined time period 307 and the image 305 captured during the detection time period 304 differs from each other in brightness, using the image 306 captured during the predetermined time period 307 as a background image is unsuitable sometimes. At a place where an automatic lighting is installed, the brightness of the image 306 captured before the detection start timing 302 may not remain constant but varies. On the other hand, during the predetermined time period 309 after the detection end timing 303, sufficient time has elapsed since the lighting is turned ON and thus camera parameters remain constant and the brightness of the image 308 hardly varies. In such a case, a more suitable background image can be acquired by using the image 308 captured during the predetermined time period 309 after the detection end timing 303 as a background image. In a case where the image 308 is to be used as a background image, the image 308 is acquired when a background image is acquired in step S42 illustrated FIG. 4. If the lighting is turned ON, for example, the external sensor 60 detects the light emission of the lighting and inputs the detection result (information) to the external sensor input unit 20.

As an example, in a case where the external sensor 60 is a sound sensor and the sound sensor detects abnormal sound, the image captured before the abnormal sound occurs may be used as a background image.

According to the above-described exemplary embodiment, the image processing unit 103 performs the human body detection processing (image processing), generates detection information, and provides the image recording function unit 102 and the privacy protection processing unit 104 with the detection information. However, the present invention is not limited to such an exemplary embodiment. For example, based on detection information from an external sensor 60, such as a human sensor and lighting sensor disposed outside, recording control and privacy protection processing may be performed. More specifically, the image processing unit 103 may function as an external sensor processing unit.

In this case, if the image processing unit 103 illustrated in FIG. 2 is used as an external sensor processing unit, an image processing apparatus having a similar configuration to the configuration illustrated in FIG. 2 can be used. The image processing unit 103 (external sensor processing unit) receives detection information from the external sensor 60 and transmits the detection information to the image recording function unit 102 and the privacy protection processing unit 104.

Alternatively, the image processing unit 103 may have a function of processing an image to generate detection information and be configured to receive the detection information from the external sensor 60. In this case, detection information acquired by the image processing and detection information acquired by the external sensor 60 are supplied to the image recording function unit 102 and the privacy protection processing unit 104 (and serve as an operation trigger).

In the flowchart illustrated in FIG. 4, the background image is updated in step S44 following step S43. However, the present exemplary embodiment is not limited to this processing procedure. In a case where the background image does not need to be updated (or in a case where the user does not want to update the background image), the processing in step S44 is skipped to proceed to step S45 from step S43. In the flowchart illustrated in FIG. 4, the background image is combined with the mask image in step S46, the input image may be combined with the mask image.

The function modules illustrated in FIG. 1 (the image processing unit 13, the privacy protection processing unit 14, and the image control unit 17) may be implemented by software. When the function modules are implemented by software, programs for offering the functions of the above-described function modules are stored in the ROM of the memory 12. The functions of these function modules are implemented when the stored programs are suitably loaded into the RAM of the memory 12 and the CPU 11 executes the programs.

The function blocks illustrated in FIG. 2 (the image input unit 101, the image recording function unit 102, the image processing unit 103, and the privacy protection processing unit 104) may be implemented by hardware. In a case where the functions of these function blocks are implemented by hardware, dedicated circuits may automatically be generated on a Field Programmable Gate Array (FPGA) by running the programs for implementing the functions of these function blocks, for example, using a predetermined compiler. By forming a Gate Array circuit similar to a FPGA or using an Application Specific Integrated Circuit (ASIC), the functions of these function blocks may be implemented by hardware.

The module and block configurations illustrated in FIGS. 1 and 2 are one example. A plurality of function modules (blocks) may configure one function module (block). Alternatively, one of the function modules (blocks) may be separated into modules (blocks) for performing a plurality of functions.

According to the first exemplary embodiment, as illustrated in FIG. 2, the image input unit 101, the image recording function unit 102, the image processing unit 103, and the privacy protection processing unit 104 are included in one image processing apparatus 10. However, the present exemplary embodiment is not limited to this configuration. For example, the image input unit 101, the image recording function unit 102, the image processing unit 103, and the privacy protection processing unit 104 may be separated into different apparatuses for each function, and a specific function unit may be configured as another apparatus. For example, the image input unit 101, the image recording function unit 102, and the image processing unit 103 may be configured as one apparatus, and the privacy protection processing unit 104 may be configured as another apparatus.

In a case where the privacy protection processing unit 104 is separately provided as another apparatus, input images may be transmitted from the image input unit 101 to the apparatus. In such a case, the privacy protection processing unit 104 directly acquires input images from the imaging unit 30. The privacy protection processing unit 104 acquires meta data indicating the detection information, together with the image 305, from the image recording function unit 102. The meta data may be included in the image 305. Based on the meta data, the privacy protection processing unit 104 acquires the image 306 acquired immediately before the detection time period 304 from input images and uses the image 306 as a background image. Then, the privacy protection processing unit 104 can generate a mask image based on the background image and the image 305 and generate a privacy protection image.

According to the first exemplary embodiment, the image processing apparatus 10 and the imaging unit 30 are connected via a network. In other words, the image processing system is configured by the image processing apparatus 10 and the imaging unit 30. According to the first exemplary embodiment, while the image processing apparatus 10 and the imaging unit 30 are separately provided, the image processing apparatus 10 and the imaging unit 30 may be integrated.

According to the present exemplary embodiments, while a totally gray silhouette image having a shape of human body has been described above as an example of a mask image, a mask image is not limited to a silhouette image. For example, an image deformed in such a manner that the gender, height, hairstyle, cloth, and body shape are unrecognizable may be used as a mask image.

According to the first exemplary embodiment, while the HDD 18 for storing images is disposed in the image processing apparatus 10, the HDD 18 may be disposed external to the image processing apparatus 10. In an environment without the external sensor 60, the image processing apparatus 10 may not be provided with the external sensor input unit 20.

According to the first exemplary embodiment, since the image 306 captured immediately before the image 305 which is a privacy protection target is used as a background image, it is possible to generate a privacy protection image based on a suitable background image. Since the image 306 captured immediately before the image 305 which is a privacy protection target is used as a background image, it is possible to generate an image in which privacy is suitably protected and output the image, and also it is possible to appropriately present the image having information about environmental changes taking place in the real world to an image viewer.

According to the present exemplary embodiment, the image captured before the detection start timing or the image captured after the detection end timing is used as a background image in generation of a privacy protection image when a human body is detected by image processing or in generation of a privacy protection image when a human body is detected by the external sensor 60. With this configuration, an image captured at a timing close to the human body detection time period can be used as a background image, and as a result, privacy protection image can be generated without searching for a background image including no human body or spending time and without calculation cost on synthesizing a background image.

According to the first exemplary embodiment, an image from one imaging unit (camera) is input and recorded to the image processing apparatus 10 to perform the privacy protection processing, the present invention is also applicable to a case where a plurality of cameras operates in a cooperative way. For example, if a monitoring area cannot be entirely monitored using one camera since the area is large, the entire monitoring area can be monitored using a plurality of cameras. A second exemplary embodiment will be described below centering on a case where three cameras A, B, and C operate in a cooperative way. The imaging areas of the cameras A and B are partly overlapped with each other, and the imaging areas of the cameras B and C are also partly overlapped with each other. The cameras A, B, and C are connected to the image processing apparatus 10 via a network. The HDD 18 has storage areas each for storing and recording images of a different one of the cameras A, B, and C.

Figure 6A:
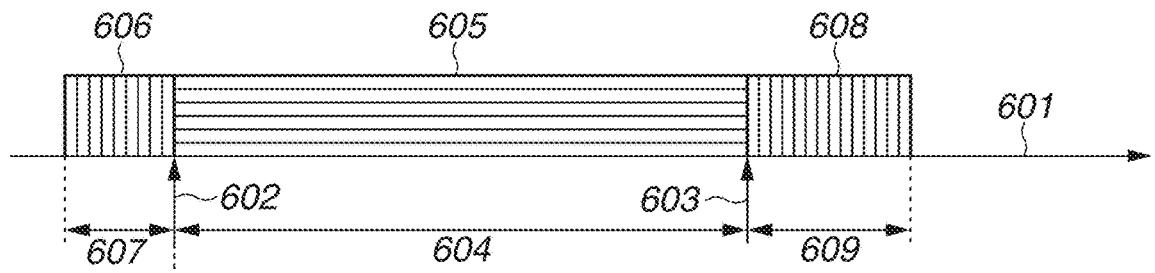
FIGS. 6A, 6B, and 6C each illustrating a timing of detecting a human body subjected to privacy protection and recording time periods according to a second exemplary embodiment.
Figure 6B:
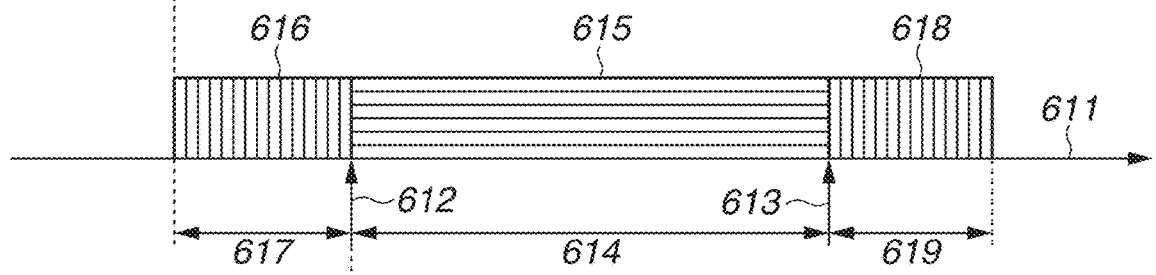
Figure 6C:
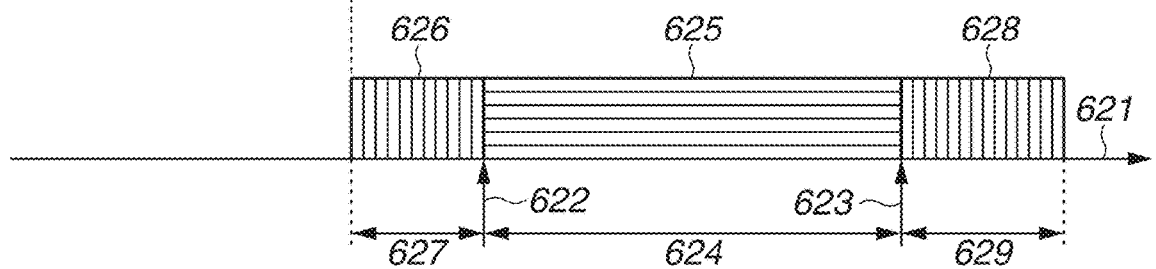

FIGS. 6A, 6B, and 6C are diagrams illustrating recording time periods of the three cameras A, B, and C, and a timing of detecting a human body to be subjected to privacy protection. A horizontal axis 601 illustrated in FIG. 6A indicates time progress of the camera A. A horizontal axis 611 illustrated in FIG. 6B indicates time progress of the camera B. A horizontal axis 621 illustrated in FIG. 6C indicates time progress of the camera C. Similar to FIG. 3, the arrows illustrated in FIGS. 6A, 6B, and 6C indicate detection start timings 602, 612, and 622, and detection end timings 603, 613, and 623, respectively. Images 605, 615, and 625 are recorded during detection time periods 604, 614, and 624, respectively. Images 606, 616, and 626 have been continuously recorded during a predetermined time before the detection start timings 602, 612, and 622, respectively. More specifically, the images 606, 616, and 626 are recorded during time periods 607, 617, and 627, respectively. Images 608, 618, and 628 are recorded during a predetermined time after the detection end timings 603, 613 and 623, respectively. More specifically, the images 608, 618, and 628 are recorded during recording time periods 609, 619, and 629, respectively.

According to the present exemplary embodiment, the cameras A, B, and C are installed, for example, on the ceiling or walls of a corridor at predetermined intervals along the longitudinal direction of the corridor. When a person walks in the corridor, it can be expected that the human body is captured by the cameras A, B, and C in this order. In the following descriptions, the human body is captured by the cameras A, B, and C in this order. The human body is kept being detected since the detection start timing 602 in the image captured by the camera A till the detection end timing 623 in the image captured by the camera C. If the person walks at a fixed speed, the imaging range of the camera A is equivalent to the total of the time periods 607, 604, and 609, the imaging range of the camera B is equivalent to the total of the time periods 617, 614, and 619, and the imaging range of the camera C is equivalent to the total of the time periods 627, 624, and 629.

In the image captured by the camera A, the image processing apparatus 10 detects a human body (privacy protection target) by the operations and processing according to the first exemplary embodiment. Then, the image processing apparatus 10 stores and records images captured during the time period 604 between the detection start timing 602 and the detection end timing 603 and images captured during the time periods 607 and 609 which are before and after the time period 604, respectively. Then, the image processing apparatus 10 generates a privacy protection image based on the images 605 and 608 or based on the images 605 and 606. The image processing apparatus 10 outputs the generated privacy protection image to the display unit 50.

In image captured by the camera B, the image processing apparatus 10 starts storing the background image 616 at the detection start timing 602 of the camera A. Since the image processing apparatus 10 recognizes human body detection in the image of the camera A, the image processing apparatus 10 starts generating a privacy protection image for the image of the camera B without waiting for the detection start timing 612.

At the detection start timing 612 after a predetermined time period has elapsed since the detection start timing 602 of the camera A, the image processing apparatus 10 detects a human body in the image captured by the camera B. Then, the image processing apparatus 10 starts recording for performing the privacy protection processing on the image captured by the camera B. The detection time period 614 for the image captured by the camera B lasts till the detection end timing 613. The image processing apparatus 10 generates a mask image and combines the mask image with the background image 616. This combination generates a privacy protection image for the image capture by the camera B. The image processing apparatus 10 outputs the privacy protection image to the display unit 50.

In parallel with the generation of a privacy protection image for the image captured by the camera A in this way, the image processing apparatus 10 starts acquiring a background image for the image captured by the camera B. More specifically, in parallel with the generation of a privacy protection image for the image captured by the camera A, the image processing apparatus 10 starts generating a privacy protection image for the image captured by the camera B.

For the image captured by the camera C, the image processing apparatus 10 starts storing the background image 626 captured at the detection start timing 612 of the camera B. Since the image processing apparatus 10 recognizes that a human body is detected in the image captured by the camera B, the image processing apparatus 10 starts generating a privacy protection image for the image captured by the camera C without waiting for the detection start timing 622.

During a time period between the detection start timing 612 of the camera B and the detection start timing 622 which is after a predetermined time period since the detection start timing 612, the image processing apparatus 10 detects a human body in the image captured by the camera C. Then, the image processing apparatus 10 starts image recording to perform the privacy protection processing on the image captured by the camera C. The detection time period 624 for the image captured by the camera C lasts till the detection end timing 623. The image processing apparatus 10 generates a mask image and combines the mask image with the background image 626. This combination generates a privacy protection image for the image to be captured by the camera C. The image processing apparatus 10 outputs the privacy protection image to the display unit 50.

In parallel with the generation of a privacy protection image for the image captured by the camera B in this way, the image processing apparatus 10 starts acquiring a background image for the image captured by camera C. More specifically, in parallel with the generation of a privacy protection image for the image captured by the camera B, the image processing apparatus 10 starts generating a privacy protection image for the image captured by the camera C.

According to the second exemplary embodiment, the following effects are acquired in addition to the effects of the first exemplary embodiment.

For the image captured by the camera B, the image processing apparatus 10 starts storing the background image to be used in a privacy protection image generated by the image processing apparatus 10 at the detection start timing 602 for the image captured by the camera A, without waiting for the detection start timing 612 for the image captured by the camera B. Therefore, for the image captured by the camera B, the image processing apparatus 10 can start generating a privacy protection image before the detection start timing 612. Thus, according to the present exemplary embodiment, the image processing apparatus 10 can start generating a privacy protection image while reducing the load on the image processing apparatus 10 even if a plurality of cameras is used. Similar effects can also be obtained in generating a privacy protection image for the image captured by the camera B and the image captured by the camera C.

Although the first and the second exemplary embodiments have been described above centering on the image processing apparatus 10, the present invention can be implemented by other exemplary embodiments. For example, the present invention can be implemented (embodied) as a system, apparatus, method, program (computer program), or recording medium (storage medium). More specifically, the present invention may be applied to a system including a plurality of devices (including a host computer, interface device, imaging apparatus, and web application) and to an apparatus including one device.

When implementing the present invention as a program, software program codes (computer program) for implementing at least one function of the above-described exemplary embodiments is supplied to a system or apparatus via a network or recording medium (storage medium), and at least one processor in a computer (or CPU or micro processing unit (MPU)) of the system or apparatus reads and executes the program codes stored in the recording medium. In this case, the storage medium is a computer-readable storage medium, and the recording medium storing the program codes constitutes the present invention.

The functions of the above-described exemplary embodiments are implemented when a computer executes a read program. However, the applicable configuration is not limited thereto. An operating system (OS) operating on the computer may perform a part or all of actual processing based on instructions of the program, and the functions of the above-described exemplary embodiments may be implemented by the processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-005146, filed Jan. 16, 2018, which is hereby incorporated by reference herein in its entirety.

What is claimed is:

1. An image processing apparatus, comprising:
   a hardware processor; and
   a memory for storing instructions to be executed by the hardware processor, wherein, when the instructions stored in the memory are executed by the hardware processor, the image processing apparatus functions as:
   a detection unit configured to detect a predetermined object in a captured image captured by an imaging unit;
   a storage unit configured to store, based on a result of an object detection, a plurality of the captured images captured during a first time period in which the predetermined object is not detected and a plurality of the captured images captured during a second time period in which the predetermined object is detected and wherein information regarding the first time period and the second time period is displayed on a timeline on a display device;
   a first acquisition unit configured to acquire, as a first image, a captured image from the plurality of the captured images captured during the first time period based on a user instruction on the information displayed by the display device;
   a second acquisition unit configured to acquire, as a second image, a captured image from the plurality of the captured images captured during the second time period;
   a generation unit configured to generate a mask image of the predetermined object based on the first and the second images; and
   a combination unit configured to combine the mask image with the first image or the second image.

2. The image processing apparatus according to claim 1, wherein, based on the result of the object detection, the first acquisition unit acquires, as the first image, a captured image captured at a timing that is within the first time period in which the predetermined object is not detected and close to a starting point or an ending point of the second time period.

3. The image processing apparatus according to claim 1, wherein the object detection includes at least one of moving object detection, human body detection, and face detection.

4. The image processing apparatus according to claim 3, wherein the image processing apparatus further functions as an object detection unit configured to perform at least one of the moving object detection, the human body detection, and the face detection, on an input image input from outside to the image processing apparatus.

5. The image processing apparatus according to claim 3, wherein the object detection is performed by an external sensor, the external sensor performing at least one of the moving object detection, the human body detection, and the face detection, the external sensor inputting a detection result to the image processing apparatus.

6. The image processing apparatus according to claim 5, wherein the external sensor includes at least one of an illumination sensor, a sound sensor, an infrared sensor, a temperature sensor, an automatic door sensor, and a distance sensor.

7. The image processing apparatus according to claim 5, wherein, based on information acquired from the external sensor, the first acquisition unit acquires a captured image as the first image.

8. The image processing apparatus according to claim 7, wherein, the external sensor includes an illumination sensor, and
wherein, in a case where the illumination sensor detects light emission, the first acquisition unit acquires, as the first image, a captured image captured after a detection time period of the predetermined object.

9. The image processing apparatus according to claim 1, wherein the first image is a captured image captured before the second time period.

10. The image processing apparatus according to claim 1, wherein the first image is a captured image captured after the second time period.

11. The image processing apparatus according to claim 1,
wherein the storage unit is configured to store the captured image captured during a detection time period of the predetermined object and the captured image captured during the time period in which the predetermined object is not detected, based on the result of the object detection, and
wherein the first acquisition unit acquires the first image from the storage unit, and the second acquisition unit acquires the second image from the storage unit.

12. The image processing apparatus according to claim 1, wherein a first input image is input from a first imaging unit to the image processing apparatus, a second input image is input from a second imaging unit to the image processing apparatus, and each of the first and the second imaging units captures a different imaging area,
wherein, on the first input image, the first acquisition unit, the second acquisition unit, the generation unit, and the combination unit respectively perform acquisition of the first image, acquisition of the second image, generation of the mask image, and combination of the first image or the second image and the mask image, by using the first input image, and
wherein, on the second input image, the first acquisition unit, the second acquisition unit, the generation unit, and the combination unit respectively perform acquisition of the first image, acquisition of the second image, generation of the mask image, and combination of the first image or the second image and the mask image, by using the second input image, and the first acquisition unit acquires, as the first image, an image captured between detection of the predetermined object in the first input image and detection of the predetermined object in the second input image.

13. An image processing system, comprising:
the image processing apparatus according to claim 1; and
an imaging unit configured to capture an image in a predetermined imaging area and supply the captured image to the image processing apparatus.

14. A non-transitory computer-readable storage medium storing a computer program to be read and executed by a computer, the program being configured to cause the computer to function as each unit of the image processing apparatus according to claim 1.

15. An image processing method, comprising:
detecting a predetermined object in a captured image captured by an imaging unit;
storing, based on a result of an object detection, a plurality of the captured images captured during a first time period in which the predetermined object is not detected and a plurality of the captured images captured during a second time period in which the predetermined object is detected;
displaying information regarding the first time period and the second time period on a timeline on a display device;
acquiring, as a first image, a captured image from the plurality of the captured images captured during the first time period based on a user instruction on the information displayed by the display device;
acquiring, as a second image, a captured image from the plurality of the captured images captured during the second time period;
generating a mask image of the predetermined object based on the first and the second images; and
combining the mask image with the first image or the second image.

* * * * *